United States Patent
Ji et al.

(10) Patent No.: US 9,094,148 B2
(45) Date of Patent: Jul. 28, 2015

(54) ADAPTIVE OPTICAL AMPLIFIER FOR WDM SYSTEMS

(71) Applicant: NEC Laboratories America, Inc., Princeton, NJ (US)

(72) Inventors: Philip Nan Ji, Cranbury, NJ (US); Junqiang Hu, Davis, CA (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 14/271,539

(22) Filed: May 7, 2014

(65) Prior Publication Data

US 2014/0334814 A1    Nov. 13, 2014

Related U.S. Application Data

(60) Provisional application No. 61/821,787, filed on May 10, 2013.

(51) Int. Cl.
*H04J 14/02* (2006.01)
*H04B 10/079* (2013.01)
*H04B 10/296* (2013.01)

(52) U.S. Cl.
CPC ........ *H04J 14/0221* (2013.01); *H04B 10/0797* (2013.01); *H04B 10/07953* (2013.01); *H04B 10/07955* (2013.01); *H04B 10/296* (2013.01)

(58) Field of Classification Search
CPC ...................... H04J 14/0201–14/022
See application file for complete search history.

(56) References Cited

U.S. PATENT DOCUMENTS

| | | | |
|---|---|---|---|
| 5,225,922 A | 7/1993 | Chraplyvy et al. | |
| 6,323,994 B1 | 11/2001 | Li et al. | |
| 6,452,719 B2 | 9/2002 | Kinoshita | |
| 2010/0158532 A1* | 6/2010 | Goto et al. | 398/81 |
| 2010/0220998 A1* | 9/2010 | Sekiya | 398/34 |
| 2012/0321306 A1* | 12/2012 | Wellbrock et al. | 398/48 |
| 2013/0071116 A1* | 3/2013 | Ong | 398/45 |

OTHER PUBLICATIONS

Ji, P.N., "Software Defined Optical Network", Proceedings of the 11th International Conference on Optical Communications and Networks (ICOCN 2012), paper THU-07, Nov. 2012, Thailand.

* cited by examiner

*Primary Examiner* — David Payne
*Assistant Examiner* — Casey Kretzer
(74) *Attorney, Agent, or Firm* — Joseph Kolodka

(57) ABSTRACT

An optical amplifier that uses software-defined optical networking (SDON) technology, with a centralized controller and flexible physical hardware (the adaptive amplifier here) to optimize the power distribution among different WDM channels in the amplifier. It considers the detailed information for each channel through the information from centralized controller. It is suitable for both single line rate and mixed line rate system, and is suitable for a wavelength division multiplexing WDM system with the same signal type or different signal types.

18 Claims, 1 Drawing Sheet

ADAPTIVE OPTICAL AMPLIFIER FOR WDM SYSTEMS

RELATED APPLICATION INFORMATION

This application claims priority to provisional application No. 61/821,787, entitled "Adaptive Optical Amplifier for WDM Systems", filed May 10, 2013, the contents thereof are incorporated herein by reference.

BACKGROUND OF THE INVENTION

The present invention relates generally to optics, and more particularly, to a an adaptive optical amplifier for wavelength division multiplexing WDM systems.

The following prior documents referenced in the application are discussed, not material to patentability of the claimed invention, nevertheless provide additional information.

[Chraplyvy] A. R. Chraplyvy, J. A. Nagel, and R. W. Tkach, "Optical transmission system equalizer", U.S. Pat. No. 5,225,922, 1993.

[Li] J. Li, S. Yuen, "WDM system equalization with EDFA optical amplifiers", U.S. Pat. No. 6,323,994 B1.

[Kinoshita] S. Kinoshita, "Optical communication system and optical amplifier", U.S. Pat. No. 6,452,719 B2, 2002.

[Ji] P. N. Ji, "Software defined optical network", Proceedings of 11th International Conference on Optical Communications and Networks (ICOCN 2012), paper THU-07, November, 2012, Thailand.

Optical amplification is a key element in an optical communication network. It amplifies the power level of the optical signal to compensate for the attenuation in fiber transmission and/or the insertion loss caused by optical components. In wavelength-division multiplexing (WDM) optical systems, multiple optical channels with different wavelengths/frequencies are transmitted concurrently over a single fiber. Optical amplifiers in WDM systems are able to amplify multiple WDM channels simultaneously to save hardware cost. They are also called repeaters. Depending on the location and usage of optical amplifier, there are different amplifier types in the WDM network, including boost amplifiers that amplify the signal exiting the transmitter, in-line amplifiers (or called line amplifiers) that amplify the signal along the transmission path, and pre-amplifiers that are placed before the receiver to amplify the signal to the suitable level to be detected. In terms of the technologies, Erbium-doped fiber amplifier (EDFA) is the most common type of optical amplifier in WDM systems. Other types include Raman amplifier (RA) and semiconductor optical amplifier (SOA). This invention applies to any amplifier type and any amplification technology.

For these optical amplifiers for WDM optical communication systems, the distribution of power among different WDM channels at the amplifier output are usually not uniform (such as having a tilt or ripple), due to the physical characteristics such as the gain media properties, etc. The non-uniformity causes different gains among different channels, and in turn causes different optical signal-to-noise-ratio (OSNR) figures. Those channels with a relatively low OSNR and low received power could result in an excessively high bit error rate. Therefore there is a need to balance/equalize the amplifier power.

Furthermore, as the WDM network becomes more dynamic and flexible, the conventional single line rate, uniform modulation format system is no longer guaranteed. Instead, different WDM channels can have different line rates, use different types of modulation format, occupy different amount of spectral width, etc. They also have different transmission distance and requirements. Therefore the required OSNR level and the optimum power level for each channel might be different in such heterogeneous WDM network, and thus the amplification requirements are also different.

A straightforward method is to adjust the input power level based on the feedback from the amplifier output [Chraplyvy], however this is not practical because this feedback technique typically requires numerous iterations, therefore is slow to complete. This is especially true as the number of channels increase. Also, this technique requires that the transmission power for each individual WDM channels can be adjusted over a large dynamic range. As the dynamic range increases, the complexity and cost of the transmission power adjusters required within the multiplexer also increase.

Another method to compensate for the tilt at the amplifier output is to set up a variable attenuator between the 2 stages of a single amplifier [FIG. 3 of Li]. It is common for an in-line amplifier to have 2 stages. By applying a suitable amount of attenuation between the 2 stages, the gain tilt slope (difference in the output power between low frequency end and high frequency end) can be mitigated. However this technique only handles the general tilt across the entire spectrum and cannot balance among individual channels.

Another method is to change the attenuator into an array of attenuators, one for each optical channel or band. Such attenuator array can be placed between the 2 amplifier stages [FIG. 7 of Li], or at the output of the amplifier to attenuate the channels/bands that has higher power (a common practice). A wavelength blocker (WB), which is an integrated optical device that consists of spectrum disperse element, array of switches/attenuators, and spectrum combination element, is commonly used. Even though this method can produce more equal power levels at the output, the optical power utilization is not efficient. The power from the high power channels is discarded (wasted) through the attenuation process, and not transferred to the other channels. The OSNR of lower power channels is not improved. Also, such equalization is only based on the power level at the amplifier output, and does not take into consideration the signal type and characteristics of individual WDM channels, therefore it is not suitable for mixed line rate system.

Another method is to use a supervisory circuit to detect the number of active WDM channels in the fiber through spectrum monitoring, and then control the amplifier based on this information [Kinoshita]. The advantage of this method is that it uses actual signal information to balance the amplifier, however the only information it can consider is the number of channels, and not other information such as the modulation format, data rate, etc.

Accordingly, there is a need for a latching WSS/WB the can be used in reconfigurable BU in submarine network, that overcomes the shortcomings of prior efforts.

BRIEF SUMMARY OF THE INVENTION

The present invention is directed to an adaptive optical amplifier system including a spectrum measuring unit for selecting a portion of an input WDM signal; and measuring a power profile, a flexible grid wavelength blocker for dispersing the optical signal from the spectrum measuring unit into different channels and selectively turning each channel on/off or attenuate the power level and then combining the resulting spectral components of the channels back into a single WDM signal; each individual channel being without uniform, predetermined spectral width and capable of having different widths that can be changed dynamically responsive to traffic conditions from a network linked to the adaptive optical amplifier system, an amplifier for amplifying output from the wavelength blocker, a amplifier controller for controlling settings of the wavelength blocker, amplifier, and receiving or processing spectrum measurement results from the spectrum measuring unit, and a centralized controller in communication with the amplifier controller.

In an alternative expression of the invention, a method for adaptive optical amplification including selecting a portion of an input WDM signal; and measuring a power profile, dispersing the optical signal from the spectrum measuring unit into different channels and selectively turning each channel on/off or attenuate the power level and then combining the resulting spectral components of the channels back into a single WDM signal; each individual channel being without uniform, predetermined spectral width and capable of having different widths that can be changed dynamically responsive to traffic conditions from a network linked to the adaptive optical amplifier system, amplifying output from the wavelength blocker, controlling settings of the wavelength blocker, amplifier, and receiving or processing spectrum measurement results from the spectrum measuring unit and linking communicatively a centralized controller with the amplifier controller.

These and other advantages of the invention will be apparent to those of ordinary skill in the art by reference to the following detailed description and the accompanying drawings.

DETAILED DESCRIPTION

The present invention is directed to an optical amplifier that uses software-defined optical networking (SDON) technology, with a centralized controller and flexible physical hardware (the adaptive amplifier here) to optimize the power distribution among different WDM channels in the amplifier. It considers the detailed information for each channel through the information from centralized controller. It is suitable for both single line rate and mixed line rate system, and is suitable for a wavelength division multiplexing WDM system with the same signal type or different signal types.

SDON is the extension of software-defined networking (SDN) that has been gaining popularity in networking applications [Ji]. The key attributes include: Separation of physical hardware plane and the control plane, Making the physical hardware flexible and software controllable, putting more intelligent at the centralized control plane, and having a common open interface between the physical hardware plane and the centralized control plane.

So far, most of the flexible optical hardware development is focused on transmission (such as variable rate transponder) and switching (such as CDC-ROADM). SDON enables dynamic selection and control of signal configuration (such as data rate, format, type, etc.) and transmission path to fit the traffic demand and physical system properties (such as transmission distance, fiber type, dispersion compensation scheme, etc.) of the entire network by a centralized controller. Optical amplifier (repeater) is also an important hardware element in the WDM network, and it also needs to become flexible to guarantee the overall network optimization.

Figure 1:
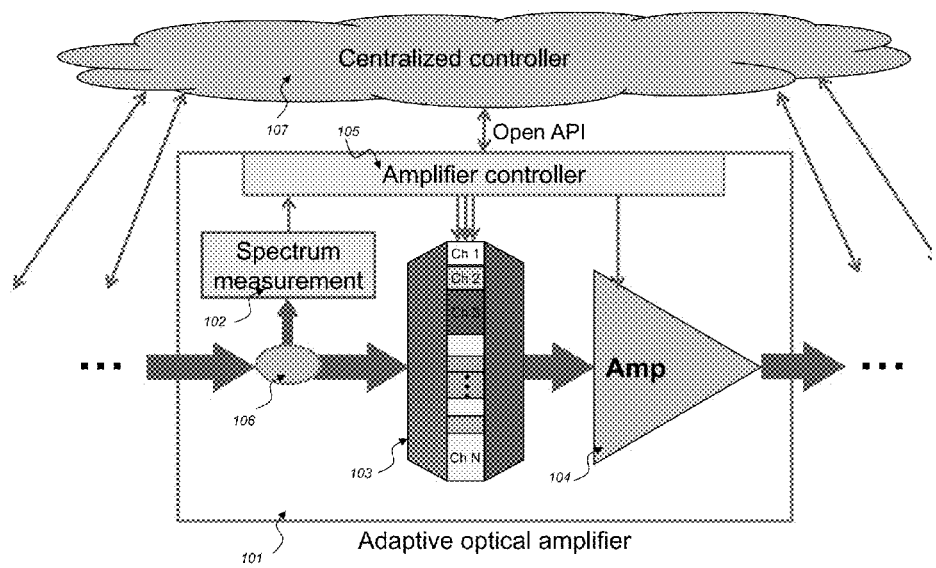
FIG. 1 is diagram of an adaptive optical amplifier and a centralized controller, in accordance with the invention.

FIG. 1 shows the proposed adaptive optical amplifier (101). It mainly consists of four components: the spectrum measurement unit (102), the flexible grid wavelength blocker (103), optical amplifier (104), and the amplifier controller (105).

The spectrum measurement unit uses a passive tap splitter (106) to tap out a small portion of input WDM signal, and measure the power profile using the measurement hardware (102).

The flexible grid wavelength blocker (103) performs the same as the a regular WB, which disperses the optical signal into different spectral components, then uses an array of optical switches/attenuators to turn each channel on/off or attenuate the power level, and then combines the signal components back to a single WDM signal. However, the difference is that here the individual channel does not have uniform, pre-determined spectral width, instead each channel can have different widths, and these widths can be changed dynamically according to the traffic condition. For example, Channel 1 can have 50 GHz width and Channel 2 can have 75 GHz width. And at the next moment Channel 1's width can be increased to 150 GHz, while Channel 2's width can be reduced to 37.5 GHz. The flexible grid wavelength blocker is commercially available based on various technology platforms such as liquid crystal on silicon (LCoS), DLP, or liquid crystal (LC). In some WB product, the optical channel monitoring (OCM) function is included at the input end and/or the output end. If input end OCM is available, a separate spectrum measurement unit (102 and 106) can be eliminated.

The optical amplifier (104) can be an EDFA or other types of optical amplifier described above. It has a certain maximum total output power, which will be distributed among all the input optical channels.

The amplifier controller (105) is an electrical circuitry to control the settings of the wavelength blocker (103) and the amplifier (104), and receives/processes the spectrum measurement results from the measurement unit (102). It also communicates with the centralized controller (107).

Figure 2:
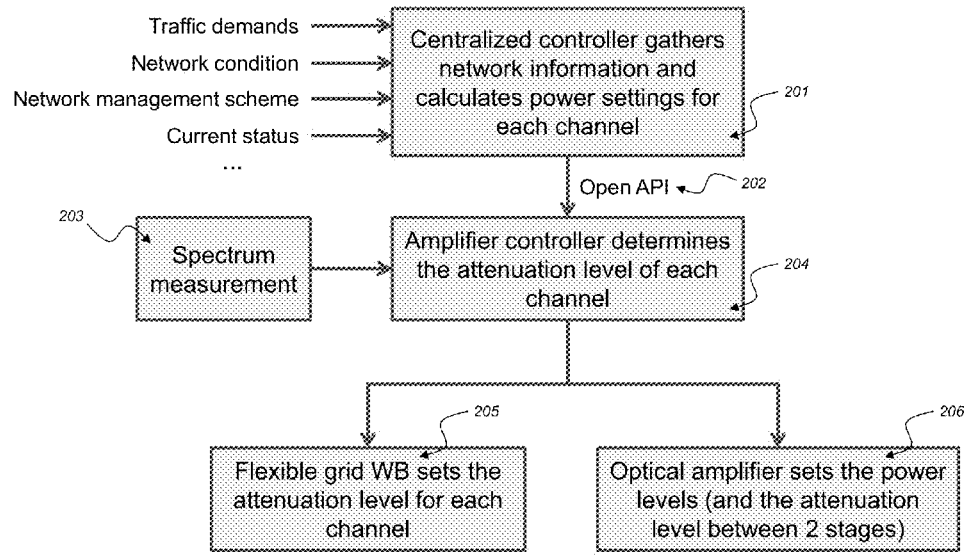
FIG. 2 is a block diagram detailing operation of the adaptive optical amplifier, in accordance with the invention.

The operation of the exemplary adaptive optical amplifier is shown in the block diagram of FIG. 2. In the first step of operation (201), the centralized controller (107) gathers the overall network information based on the traffic demand, physical and logical network condition, the network management scheme, and the execution status. Because of this centralized structure, it is aware of the information of the WDM signals entering the adaptive optical amplifier (101), including how many channels are transmitted, and each channel's detail information such as the center wavelength/frequency, spectral width, data rate, modulation format, polarization state, signal type, coding scheme, the destination, etc. Based on this information, as well as the information of the entire network, such as the type of fiber in the transmission route, the centralize controller calculates the optimum power level of each channel, and the best distribution of the amplifier output power among these channels. Different control algorithm can be used. This is a benefit of SDN architecture, because the control and management can be changed without changing the physical hardware (or even without the detailed knowledge of the physical hardware's operation). The optimum power level and amplifier output power distribution information is sent to the amplifier's controller (105) via a common application programming interface (API, 202). An option for the open API is the OpenFlow protocol with extension that includes optical channel information and power level fields.

Concurrently (203), the spectrum measurement hardware (102) measures the optical spectrum profile of the input WDM signals. The measured data are sent also sent to the amplifier controller.

In the next step (204), the amplifier controller (105) uses the WDM channel information from the centralized controller and the measured spectrum data to calculate the power level and OSNR of each input WDM channels. It then compares this current status information with the target power setting distribution information (also from the centralized controller) to calculate the configuration for the flexible grid WB (103) and optical amplifier (104). These configuration settings are sent to the hardware via internal control signal circuit.

After receiving the setting, the flexible grid WB sets the passband width and the attenuation level for each blocker channel according to the instruction (205). This will provide the relative power levels among the WDM channel before entering the optical amplifier component.

At the same time (206), the optical amplifier is configured according to the setting instruction from the amplifier controller. The settings include the power level of each amplification stage, and the attenuation level in between (if the mid-stage control is available). The mid-stage control provides the tilt equalization. Through this control, the total output power from the optical amplifier is distributed among the WDM channels in an optimal manner (not necessarily equal power among all channels). If the total required power is below the maximum output power from the amplifier, the amplifier's output level can be reduced. In either way, no amplifier's optical power is wasted.

In the network, the centralized controller also controls other network elements, such as transponders, switching nodes, etc. as shown in FIG. 1.

From the foregoing it can be appreciated that this invention provides advantages that include

- Better transmission performance among the WDM channels, which leads to long transmission distance, better impairment tolerance, higher system margin, etc.
- More efficient energy consumption: The amplifier power is not wasted, but transferred among WDM channels to optimize the overall performance.
- Fast response: No feedback loop is required at the amplifier, therefore it does not require multiple iterations to achieve the optimal state.
- Easy control: By using SDON architecture, the centralized controller can control each hardware element based on overall network information, and different control scheme can be used without changing the hardware.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. An adaptive optical amplifier system with a plurality of amplification stages controlled by a centralized controller in communication with amplifier controllers, each amplification stage comprising:

a spectrum measuring unit for selecting a portion of an input WDM signal and measuring a power profile;

a flexible grid wavelength blocker (WB) split from the spectrum measuring unit for dispersing the optical signal into different channels and selectively turning each channel on/off or attenuate the power level and then combining the resulting spectral components of the channels back into a single WDM signal; each individual channel having non-uniform, predetermined spectral width that is changed dynamically responsive to traffic conditions from a network linked to the adaptive optical amplifier system;

an amplifier for amplifying output from the wavelength blocker;

an amplifier controller for controlling settings of the wavelength blocker and amplifier, receiving and processing spectrum measurement results from the spectrum measuring unit, wherein the optical amplifier is configured according to setting instruction from the amplifier controller and the settings include a power level of each amplification stage, and an attenuation level providing tilt equalization, and wherein a total output power from the optical amplifier is distributed among the WDM channels.

2. The system of claim 1, wherein the centralized controller is configured to gather network information and calculates power settings for each channel.

3. The system of claim 1, wherein the centralized controller is configured to gather overall network information based on traffic demand, physical and logical network conditions, a network management scheme and execution status.

4. The system of claim 1, wherein the centralized controller is configured to gather information of the input WDM signal including at least one of how many channels are transmitted, each channels center wavelength frequency, spectral width, data rate, modulation format, polarization state, signal type, coding scheme, and destination.

5. The system of claim 1, wherein the centralized controller is configured to calculate optimum power level of each channel and best distribution of output power of the channels.

6. The system of claim 1, wherein different control processes can be used enabling changing control and management without changing physical hardware or without detailed knowledge of the physical hardware's operation.

7. The system of claim 1, wherein the centralized controller comprises sending optimum power level and amplifier output power distribution to the amplifier controller via a common application programming interface.

8. The system of claim 7, wherein the application programming interface comprises OpenFlow protocol with an extension that includes optical channel information and power level fields.

9. The system of claim 1, wherein the amplifier controller uses WDM channel information from the centralized controller and the measured spectrum data to calculate power level and optical-signal-to-noise-ratio OSNR of each input WDM channels, then compares this current status information with a target power setting distribution information, also from the centralized controller, to determine a configuration for the flexible grid wavelength blocker and optical amplifier.

10. The system of claim 1, wherein the amplifier configuration enables the total output power from the optical amplifier to be distributed among WDM channels in an optimal manner, not necessarily equal power among all channels, and if total required power is below a maximum output power from the amplifier, the amplifier's output level is reduced thereby enabling no waste of optical power from the amplifier.

11. A method for adaptive optical amplification with a plurality of amplification stages controlled by a centralized controller in communication with amplifier controllers, comprising the steps of:
   i) selecting a portion of an input WDM signal and measuring a power profile
   ii) dispersing the optical signal from the spectrum measuring unit into different channels and selectively turning each channel on/off or attenuate the power level and then combining the resulting spectral components of the channels back into a single WDM signal; each individual channel being without uniform, predetermined spectral width that can be changed dynamically responsive to traffic conditions from a network linked to the adaptive optical amplifier system
   iii) amplifying output from the wavelength blocker;
   iv) controlling settings of the wavelength blocker, amplifier, and receiving or processing spectrum measurement results from the spectrum measuring unit and
   v) linking communicatively a centralized controller with the amplifier controller wherein the optical amplifier is configured according to setting instruction from the amplifier controller and the settings include a power level of each amplification stage, and an attenuation level providing tilt equalization, and wherein a total output power from the optical amplifier is distributed among the WDM channels.

12. The method of claim 11, wherein step v) comprises being aware of information of the input WDM signal including at least one of how many channels are transmitted, each channels center wavelength frequency, spectral width, data rate, modulation format, polarization state, signal type, coding scheme, and destination.

13. The method of claim 11, wherein step v) comprises determining optimum power level of each channel and best distribution of output power of the channels.

14. The method of claim 11, wherein step v) enables different control processes to for changing control and management without changing physical hardware or without detailed knowledge of the physical hardware's operation.

15. The method of claim 11, wherein step v) comprises sending optimum power level and amplifier output power distribution to amplification of step iii) via a common application programming interface.

16. The method of claim 15, wherein the application programming interface comprises OpenFlow protocol with an extension that includes optical channel information and power level fields.

17. The method of claim 11, wherein step v) comprises using WDM channel information and measured spectrum data to calculate power level and optical-signal-to-noise-ratio OSNR of each input WDM channel, then comparing this current status information with a target power setting distribution information, also from the centralized controller, to determine a configuration for step ii) and step iii).

18. The method of claim 11, wherein step iii) amplification enables a total output power from the to be distributed among WDM channels in an optimal manner, not necessarily equal power among all channels, and if total required power is below a maximum output power from the amplification, the output level from step iii) is reduced thereby enabling no waste of optical power from step iii) amplification.

* * * * *